US012646655B2

(12) United States Patent
An et al.

(10) Patent No.: US 12,646,655 B2
(45) Date of Patent: Jun. 2, 2026

(54) SILICON CAPACITOR WITH THIN FILM DEPOSITION ON 3D STRUCTURE AND ITS MANUFACTURING METHOD

(71) Applicant: ELSPES INC., Daejeon (KR)

(72) Inventors: Ji Hwan An, Seoul (KR); Sa Rah Eun Kyung Kim, Seoul (KR); Do Hyun Go, Seogwipo-si (KR); Jeong Woo Shin, Seoul (KR)

(73) Assignee: ELSPES INC., Daejeon (KR)

( * ) Notice: Subject to any disclaimer, the term of this patent is extended or adjusted under 35 U.S.C. 154(b) by 232 days.

(21) Appl. No.: 18/172,014

(22) Filed: Feb. 21, 2023

(65) Prior Publication Data

US 2023/0197352 A1 Jun. 22, 2023

Related U.S. Application Data

(63) Continuation-in-part of application No. PCT/KR2021/001601, filed on Feb. 8, 2021.

(30) Foreign Application Priority Data

Oct. 30, 2020 (KR) .......................... 10-2020-0143763

(51) Int. Cl.
$H01G\ 4/33$ (2006.01)
$H01G\ 4/012$ (2006.01)
(Continued)

(52) U.S. Cl.
CPC ................. *H01G 4/33* (2013.01); *H01G 4/06* (2013.01); *H01G 4/306* (2013.01); *H01G 4/012* (2013.01); *H01G 4/228* (2013.01)

(58) Field of Classification Search
CPC   H01G 4/33; H01G 4/06; H01G 4/306; H01G 4/012; H01G 4/228; H01G 4/1272;
(Continued)

(56) References Cited

U.S. PATENT DOCUMENTS 5,390,072 A * 2/1995 Anderson ................ H10D 1/68
                                                        29/25.42
5,939,747 A * 8/1999 Yajima ................... H10D 1/042
                                                        257/311
(Continued)

FOREIGN PATENT DOCUMENTS

JP      2006-261416 A      9/2006
JP      2012142451 A   *  7/2012
(Continued)

OTHER PUBLICATIONS

Yongmin Kim et al., "Plasma-enhanced atomic layer deposition of barium titanate with aluminum incorporation," Acta Materialia, 2016, pp. 153-159, vol. 117.

*Primary Examiner* — Timothy J. Dole

(57) ABSTRACT

A silicon capacitor may include a silicon substrate having a three-dimensional pattern, and a dielectric thin film disposed over the silicon substrate and having a structure with a crystal gradient form. A manufacturing method of a dielectric thin film capacitor may include etching a silicon substrate to form a three-dimensional pattern, depositing an amorphous thin film on the etched silicon substrate at a temperature below 300° C., and embedding crystalline grains in the deposited amorphous thin film by performing plasma treatment. A manufacturing method of a dielectric thin film capacitor may include etching a silicon substrate to form a three-dimensional pattern, depositing an amorphous thin film on the etched silicon substrate at a temperature below 300° C., and depositing a crystalline layer on the deposited amorphous thin film by performing plasma treatment.

4 Claims, 10 Drawing Sheets

1: Mixed layer

Increasing permittivity by Embedded crystalline grains

Blocking electrical conduction electrons by amorphous matrix

2: Bi-layer

Increasing permittivity by a crystalline layer

(51) Int. Cl.
  *H01G 4/06* (2006.01)
  *H01G 4/228* (2006.01)
  *H01G 4/30* (2006.01)

(58) Field of Classification Search
  CPC ......... H01G 4/085; C23C 16/56; H01L 21/02; H10D 1/711; H10N 97/00
  See application file for complete search history.

(56) References Cited

U.S. PATENT DOCUMENTS

| | | | | |
|---|---|---|---|---|
| 6,340,621 | B1 * | 1/2002 | Anderson | ............. C23C 14/088 257/E21.272 |
| 7,557,015 | B2 * | 7/2009 | Sandhu | .................. H10D 1/716 438/254 |
| 8,946,772 | B2 * | 2/2015 | Okagawa | ......... H01L 21/02433 257/613 |
| 9,882,087 | B2 * | 1/2018 | Faurie | ................. H01L 21/0254 |
| 2001/0015453 | A1 * | 8/2001 | Agarwal | ........... H01L 21/02183 257/E21.272 |
| 2002/0006734 | A1 * | 1/2002 | Imai | .......................... G03F 1/70 257/E21.018 |
| 2002/0115252 | A1 * | 8/2002 | Haukka | ................ H10D 64/685 257/E21.01 |
| 2005/0001212 | A1 * | 1/2005 | Matsui | ................... H10D 1/682 257/E21.018 |
| 2005/0035390 | A1 * | 2/2005 | Beroz | .................. H01G 9/042 257/E21.396 |

| | | | | |
|---|---|---|---|---|
| 2007/0102742 | A1 * | 5/2007 | Kil | .................... H01L 21/02194 257/295 |
| 2008/0142474 | A1 * | 6/2008 | Kim | ........................ H10D 1/716 216/6 |
| 2008/0237794 | A1 * | 10/2008 | Shoji | ...................... H01G 4/012 257/532 |
| 2009/0244808 | A1 * | 10/2009 | Ohtsuka | .................... H01G 4/06 361/311 |
| 2010/0118465 | A1 * | 5/2010 | Onishi | ..................... H01G 4/01 257/532 |
| 2013/0189602 | A1 * | 7/2013 | Lahiri | .................... H01G 4/015 977/762 |
| 2014/0092524 | A1 * | 4/2014 | Kim | .......................... H01G 4/33 156/154 |
| 2017/0162776 | A1 * | 6/2017 | Boukai | ................. H10N 10/855 |
| 2018/0226468 | A1 * | 8/2018 | Seo | ................... H01L 21/02315 |
| 2020/0051749 | A1 * | 2/2020 | Suemasa | ................ H10D 1/696 |
| 2020/0066443 | A1 * | 2/2020 | Lu | .......................... H01G 4/008 |
| 2020/0185155 | A1 * | 6/2020 | Voiron | .................... H01L 25/16 |
| 2020/0350203 | A1 * | 11/2020 | Fratin | .............. H01L 21/76843 |
| 2021/0057224 | A1 * | 2/2021 | Peng | ................. H01L 21/02356 |
| 2021/0134810 | A1 * | 5/2021 | Lin | ........................ H10D 1/716 |
| 2021/0142946 | A1 * | 5/2021 | Kang | .................. H10D 64/691 |

FOREIGN PATENT DOCUMENTS

| | | |
|---|---|---|
| KR | 1999-005439 A | 1/1999 |
| KR | 10-2006-0135193 A | 12/2006 |
| KR | 10-2007-0050163 A | 5/2007 |
| KR | 10-1036425 B1 | 5/2011 |
| KR | 10-2012-0069797 A | 6/2012 |

* cited by examiner

#1: Mixed layer

Increasing permittivity
by Embedded
crystalline grains

Blocking electrical conduction
electrons by amorphous matrix

#2: Bi-layer

Increasing permittivity
by a crystalline layer (a) Amorphous film (b) Crystal-embedded amorphous film (c) Crystal-amorphous bi-layer film
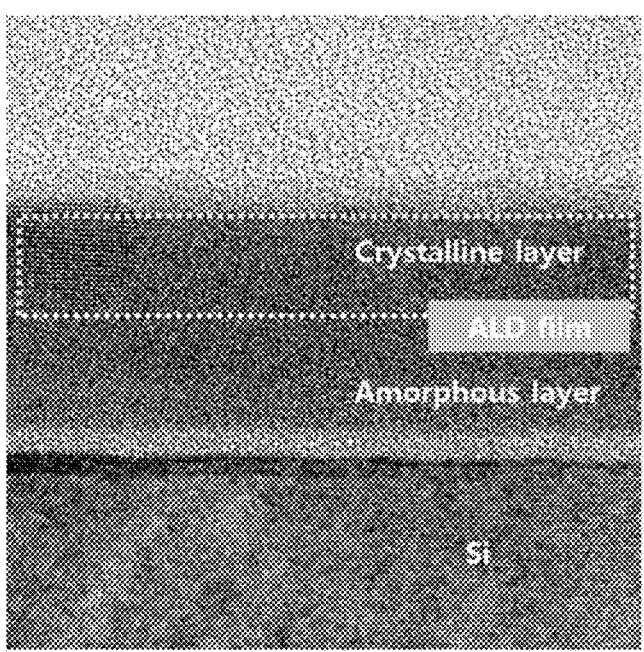
FIG. 2C
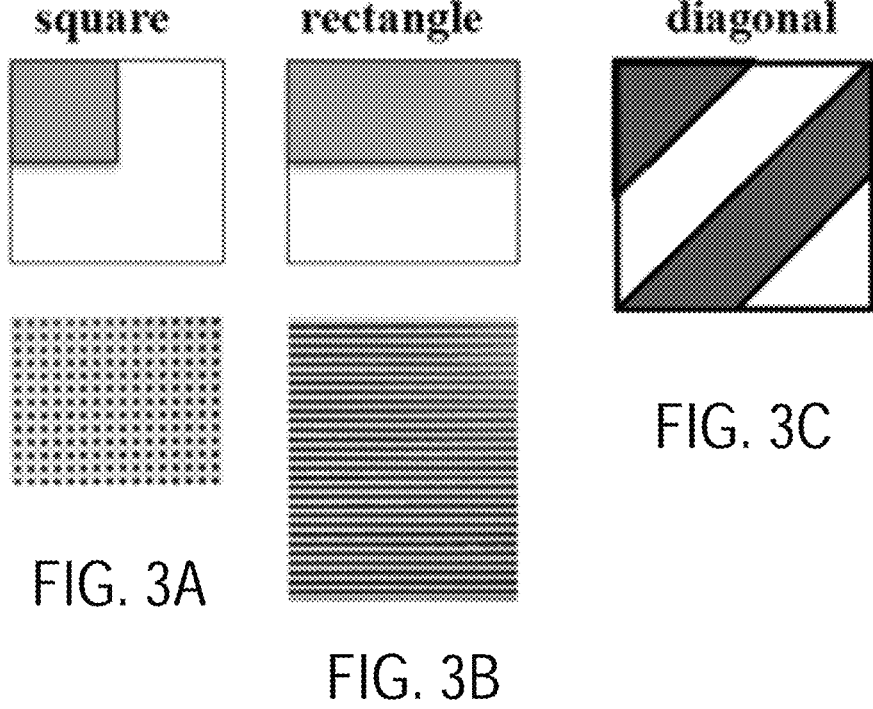
FIG. 3A
FIG. 3B
FIG. 3C

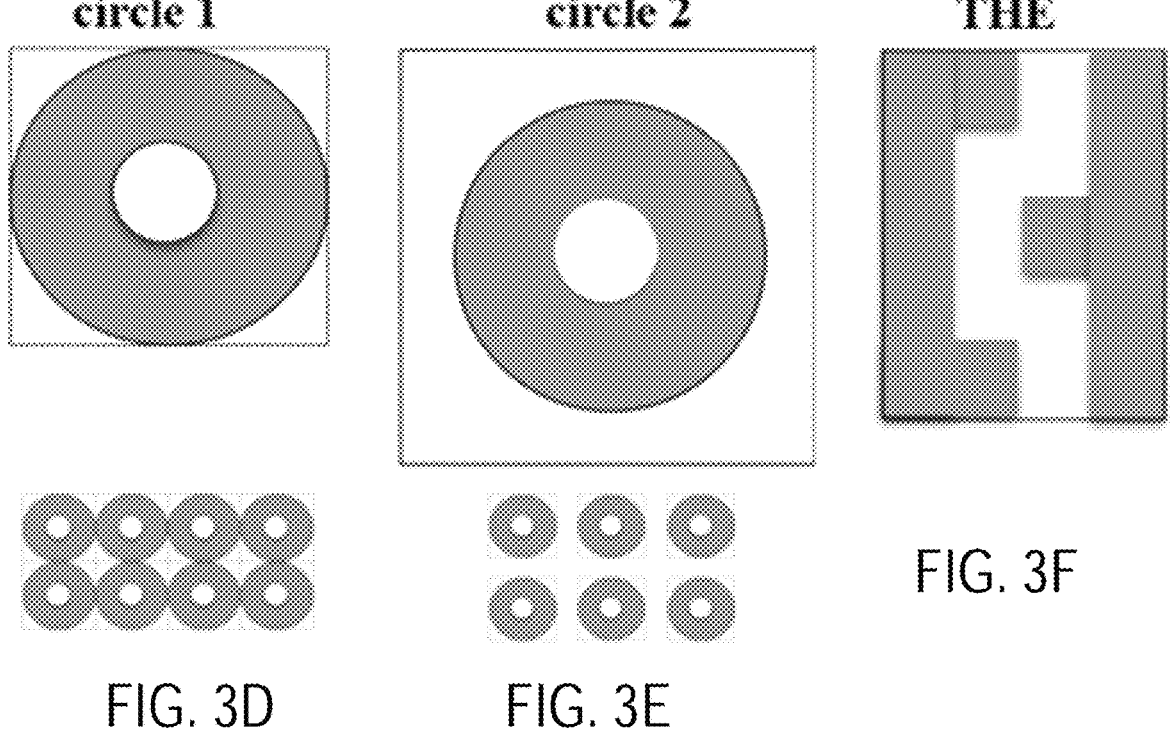
FIG. 3D
FIG. 3E
FIG. 3F
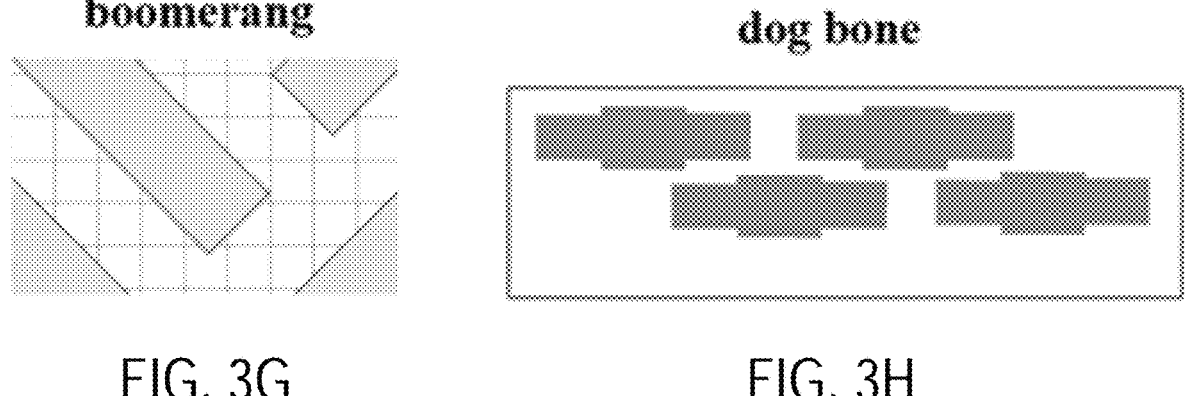
FIG. 3G
FIG. 3H

SILICON CAPACITOR WITH THIN FILM DEPOSITION ON 3D STRUCTURE AND ITS MANUFACTURING METHOD

CROSS-REFERENCE TO RELATED APPLICATIONS

This application is a continuation-in-part of International Application No. PCT/KR2021/001601, filed on Feb. 8, 2021, which claims priority to Korean Patent Application No. 10-2020-0143763, titled "SILICON BASED CAPACITOR BASED ON DEPOSITION THIN FILM ON A THREE DIMENSIONAL STRUCTURE AND ITS MANUFACTURING METHOD", filed in the Korean Intellectual Property Office on Oct. 30, 2020, both of the above applications are hereby incorporated by reference in their entireties.

This application has been conducted by the support of Ministry of SMEs and Startups of Republic of Korea. Research title is "Start-up Leap Package", and the subject identification number is 20084120.

TECHNICAL FIELD

Embodiments of the present disclosure relate to a silicon capacitor and its manufacturing method, and more particularly, to a silicon capacitor based on deposition of thin film on a three-dimensional structure and its manufacturing method.

BACKGROUND

Recently, in the industry 4.0, SIP (System-in-Package) technologies are being commercialized due to the increase in demand for mobile devices with multifunction and complex system such as smart phones and wearable devices. Modern SIP technology goes beyond simply stacking several ICs (integrated circuit) on a multi-layer PCB (printed circuit board) and connecting them using wire-bonding, and new solutions are being adopted for implementing more complex systems.

On the other hand, the non-memory (i.e. logic) semiconductor industry such as artificial intelligence, unlike the general memory semiconductor industry, is increasing its dependence on advanced semiconductor packaging technology, to alleviate the burden of fixed costs concentrated on IC integration. In addition, as the size and pitch of I/0 are reduced due to IC scaling, miniaturization trend in the semiconductor market from wafer level to fan-out WLP (fan-out wafer-level packaging) is leading to miniaturization of packaging technologies. Accordingly, an ultra-thin film process-based capacitor is desirable for TSV or 3D integration process technology, which is a new process using the same.

Globally, competition in technology development related to the embedding of passive elements in the semiconductor packaging is accelerating. The use of ultra-thin film capacitors may be desirable for achieving high performance and high-density integration of processor chips.

In particular, the thickness of the dielectric film tends to be reduced to improve capacitance density in a trench structure having a high aspect ratio of a high-k 3D capacitor. However, the decrease in dielectric film thickness may increase leakage current and decrease breakdown voltage due to tunneling current below a certain thickness. In the field, it has been reported that dielectric constant and leakage current are related to crystallinity of a thin film. In general, the dielectric constant increases as the crystallinity increases. However, since the grain boundary serves as a conduction path, the leakage current tends to increase as the crystallinity increases. To lower the leakage current of the crystalline thin film, a composite thin film can be manufactured to have a relatively low-K thin film (e.g., $Al_2O_3$) inserted in the middle, but this may lower the overall capacitance density and side effects due to interdiffusion and the like may occur at interfaces between heterogeneous thin films.

SUMMARY

Embodiments of the present disclosure provides a silicon capacitor comprising a silicon substrate having a three-dimensional pattern, and a dielectric thin film disposed over the silicon substrate and having a structure with a crystal gradient form.

In an embodiment, a method for manufacturing a capacitor includes etching a silicon substrate to form a three-dimensional pattern; depositing an amorphous thin film on the etched silicon substrate at a low temperature; and embedding crystalline grains in the deposited amorphous thin film by performing plasma treatment.

In an embodiment, a method for manufacturing a capacitor includes etching a silicon substrate to form a three-dimensional pattern; depositing an amorphous thin film on the etched silicon substrate at a low temperature; and depositing a crystalline layer on the deposited amorphous thin film by performing plasma treatment.

In an embodiment, to lower impedance and improve performance in a final product of a silicon capacitor, a capacitor fabricated on a silicon substrate is packaged and provided by flip chip bonding technology instead of wire bonding.

In addition, an electronic device applied to a semiconductor or MEMS including the silicon capacitor according to an embodiment of the present disclosure is provided.

In an embodiment, a silicon capacitor manufacturing technology using ALD and PEALD processes, which can improve capacitance density ($nF/mm^2$), leakage current density ($A/cm^2$), and breakdown voltage ($MV/cm$), which are the main performance of the device, compared to existing technologies. More specifically, by using plasma during manufacturing, it is possible to deposit a thin film having low impurities and high crystallinity, thereby improving permittivity and capacitance density.

In addition, a method of manufacturing a capacitor according to an embodiment of the present disclosure can precisely control the thickness and composition of the thin film, so it is possible to implement a combination of materials or structures showing optimal performance in terms of capacitance density, leakage current, and breakdown voltage. Since it can deposit thin films uniformly on large area, it is easy to respond to the mass production process in the future.

In addition, packaging using a flip chip bump and a three-dimensional structure having a high capacitance per unit area on a silicon substrate helps to improve performance.

BRIEF DESCRIPTION OF DRAWINGS

FIG. 2C is a photograph of a thin film plasma-treated for 180 minutes after film deposition, which shows a thin film having a combination structure of a crystallized layer and an amorphous layer, according to an embodiment.

FIGS. 3A, 3B, 3C, 3D, 3E, 3F, 3G, and 3H each show a three-dimensional pattern of a silicon substrate according to embodiments.

DESCRIPTION OF EMBODIMENTS

A detailed description of embodiments is provided below along with accompanying figures. The scope of this disclosure is limited by the claims and encompasses numerous alternatives, modifications and equivalents. Although steps of various processes are presented in a given order, embodiments are not necessarily limited to being performed in the listed order. In some embodiments, certain operations may be performed simultaneously, in an order other than the described order, or not performed at all.

Numerous specific details are set forth in the following description. These details are provided to promote a thorough understanding of the scope of this disclosure by way of specific examples, and embodiments may be practiced according to the claims without some of these specific details. Accordingly, the specific embodiments of this disclosure are illustrative, and are not intended to be exclusive or limiting. For the purpose of clarity, technical material that is known in the technical fields related to this disclosure has not been described in detail so that the disclosure is not unnecessarily obscured.

Hereinafter, various embodiments of the present disclosure will be described in detail.

Embodiments of the present disclosure relate to a three-dimensional silicon capacitor, more specifically, comprising a silicon substrate having an increased surface area by being etched into a three-dimensional structure, and a dielectric thin film in which a single-component or heterogeneous dielectric is formed with a crystal gradient form on the silicon substrate.

Figure 1A:
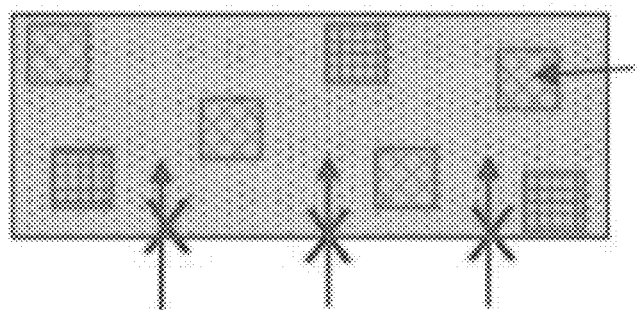
FIG. 1A shows a thin film structure in which crystalline grains are embedded in an amorphous thin film according to an embodiment of the present disclosure.
Figure 1B:
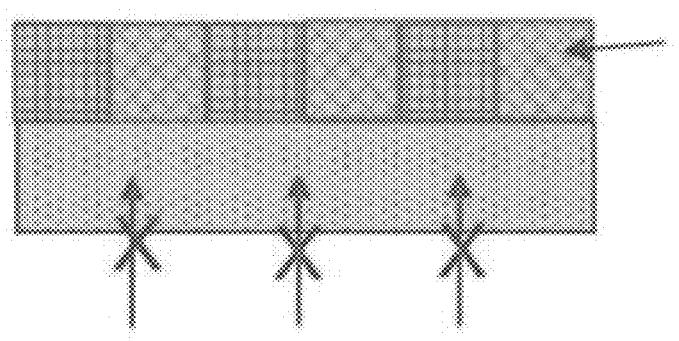
FIG. 1B shows a thin film structure including a crystalline layer disposed on an amorphous layer according to another embodiment of the present disclosure.

For example, the term "crystal gradient form" may be understood as embedding one or more crystalline grains in the amorphous thin film as shown in FIG. 1A, or stacking one or more crystalline layers on the amorphous thin film as shown in FIG. 1B.

First, as a first component of the three-dimensional silicon capacitor of embodiments of the present disclosure, a silicon substrate having an increased surface area by being etched into a three-dimensional structure is included. In other words, one or more portions of a silicon substrate may be etched to increase a surface area of the silicon substrate.

In order to increase capacitance per unit area, (1) the thickness of the dielectric may be reduced, (2) the surface area may be increased, or (3) a dielectric (high-k) material having a high dielectric constant may be used. Among them, in embodiments of the present disclosure, a silicon substrate etched into a three-dimensional structure having various designs is used to increase the surface area per unit area. For example, one or more portions of a silicon substrate may be etched to have various three-dimensional patterns, thereby increasing a ratio of the upper surface area to the plane area seen in a top view. Selecting a design that matches characteristics such as leakage as an example of electrical characteristics in addition to capacitance in the configuration of such a design may be desirable for embodiments of the present disclosure.

Three-dimensional structure in embodiments of the present disclosure may be one or more of a square pattern (square), a rectangle pattern (rectangle), a diagonal pattern (diagonal), a first circle pattern (circle 1), a second circle pattern (circle 2), a THE pattern (THE), a boomerang pattern (boomerang), and a Dogbone pattern (dog bone), as shown in FIGS. 3A to 3I. In FIGS. 3A to 3H, the shaded portions may be etched from the silicon substrate to become a hole, or the non-shaded portion may be etched and raised like a pillar.

Figure 4:
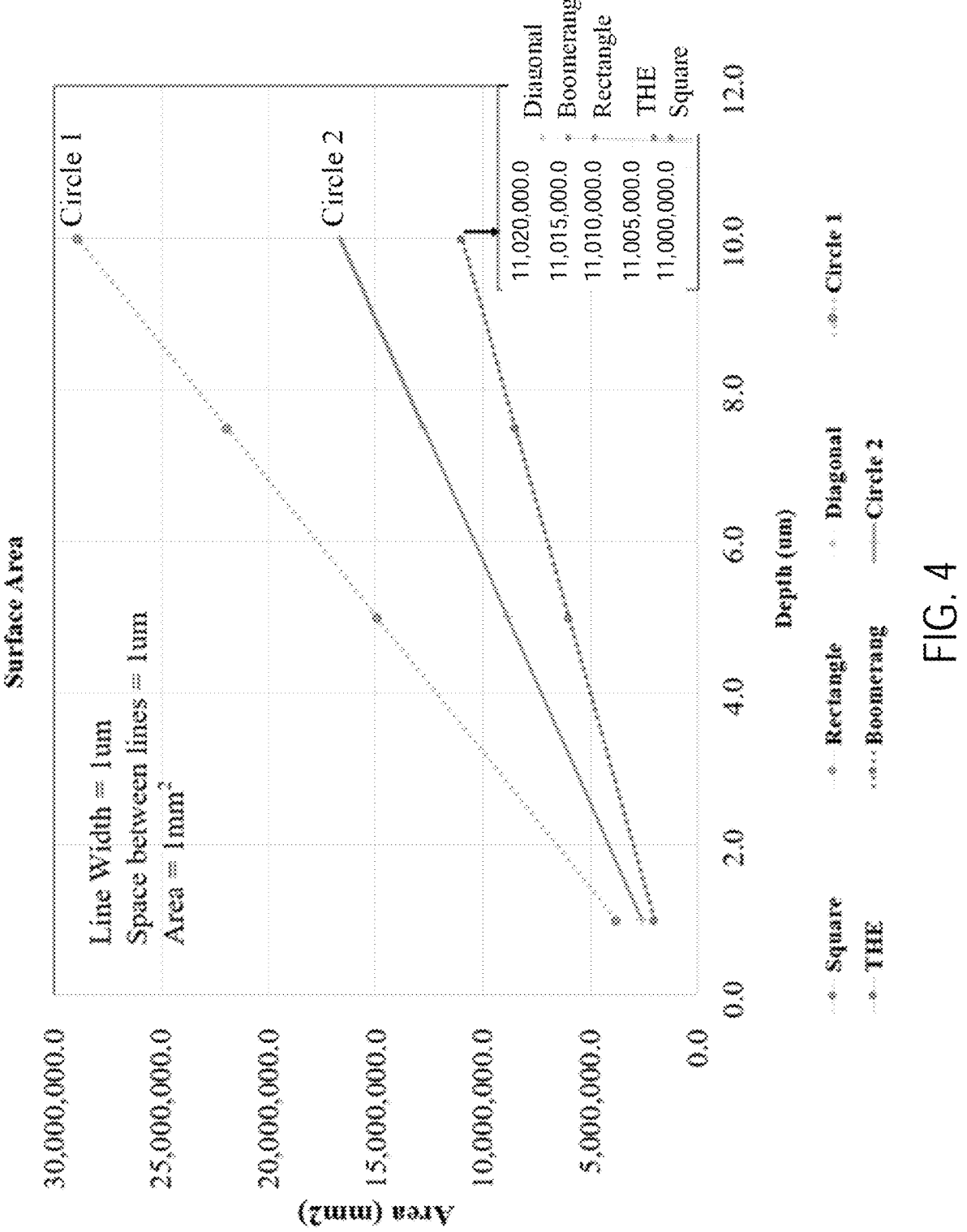
FIG. 4 is a graph showing surface areas of the three-dimensional patterns of FIGS. 3A to 3H according to embodiments.

The surface area of the three-dimensional structure for each design of FIG. 3 is calculated as shown in FIG. 4. This calculation was based on a unit area of 1 mm$^2$, and the width of the line to be etched and the space between the lines were calculated to be 1 μm, respectively.

As shown in FIG. 4, the first circle pattern (Circle 1) in FIG. 3D and the second circle pattern (Circle 2) in FIG. 3E each show a significantly greater increase in the surface area per unit area compared to the remaining patterns in FIGS. 3A, 3B, 3C, 3F, 3G, and 3H. For example, each of the first circle pattern in FIG. 3D and the second circle pattern in FIG. 3E may include a plurality of protruding or recessed portions each having an annular cylinder shape. The first circle pattern in FIG. 3D may differ from the second circle pattern in FIG. 3E in that outer surfaces of an adjacent pair of the plurality of protruding or recessed portions in the first circle pattern in FIG. 3D contact each other, whereas outer surfaces of an adjacent pair of the plurality of protruding or recessed portions in the second circle pattern in FIG. 3E are spaced apart from each other by a given distance.

Figure 5A:
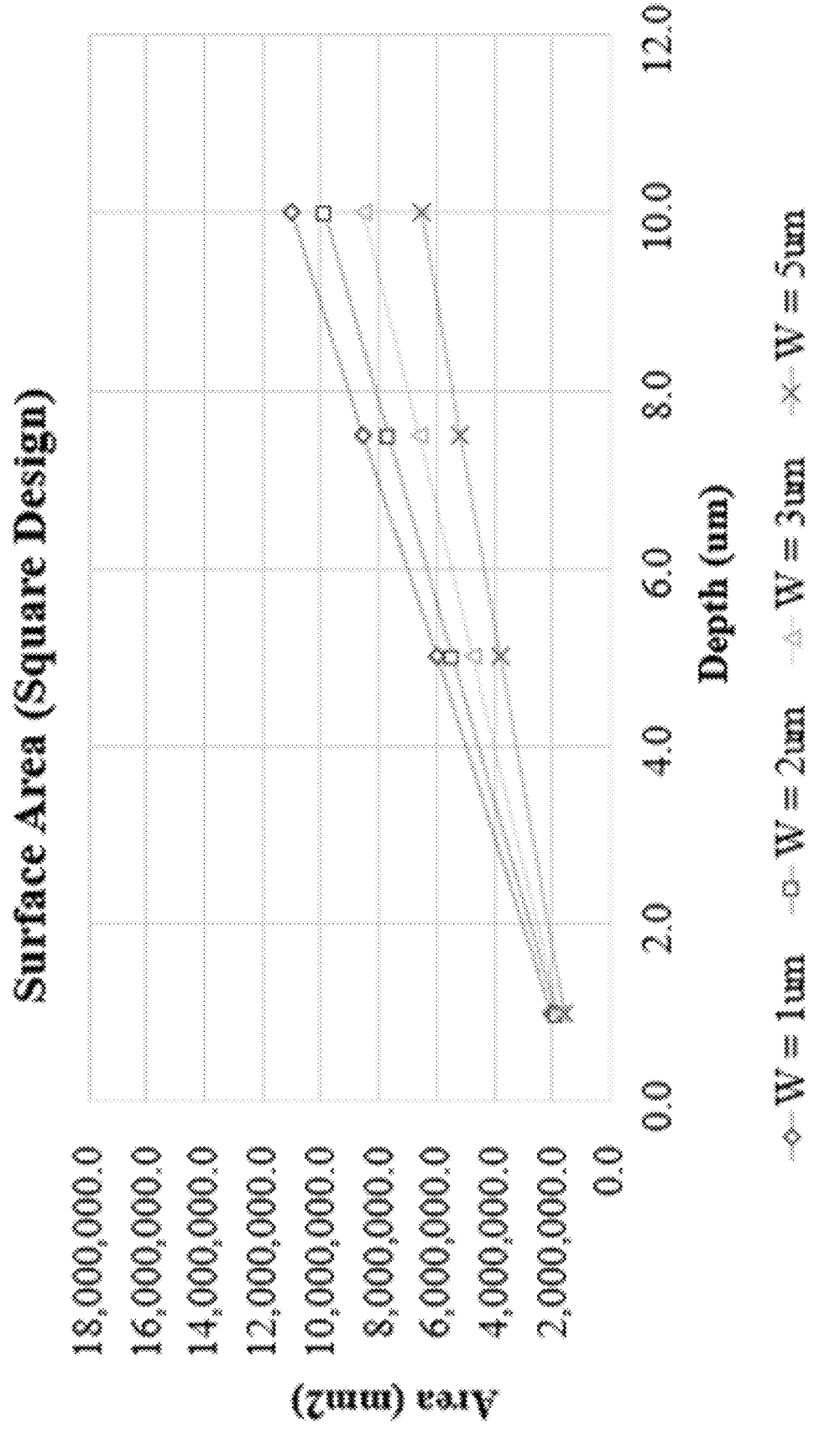
FIG. 5A illustrates surface areas according to the depth of the three-dimensional pattern of FIG. 3A according to an embodiment.
Figure 5B:
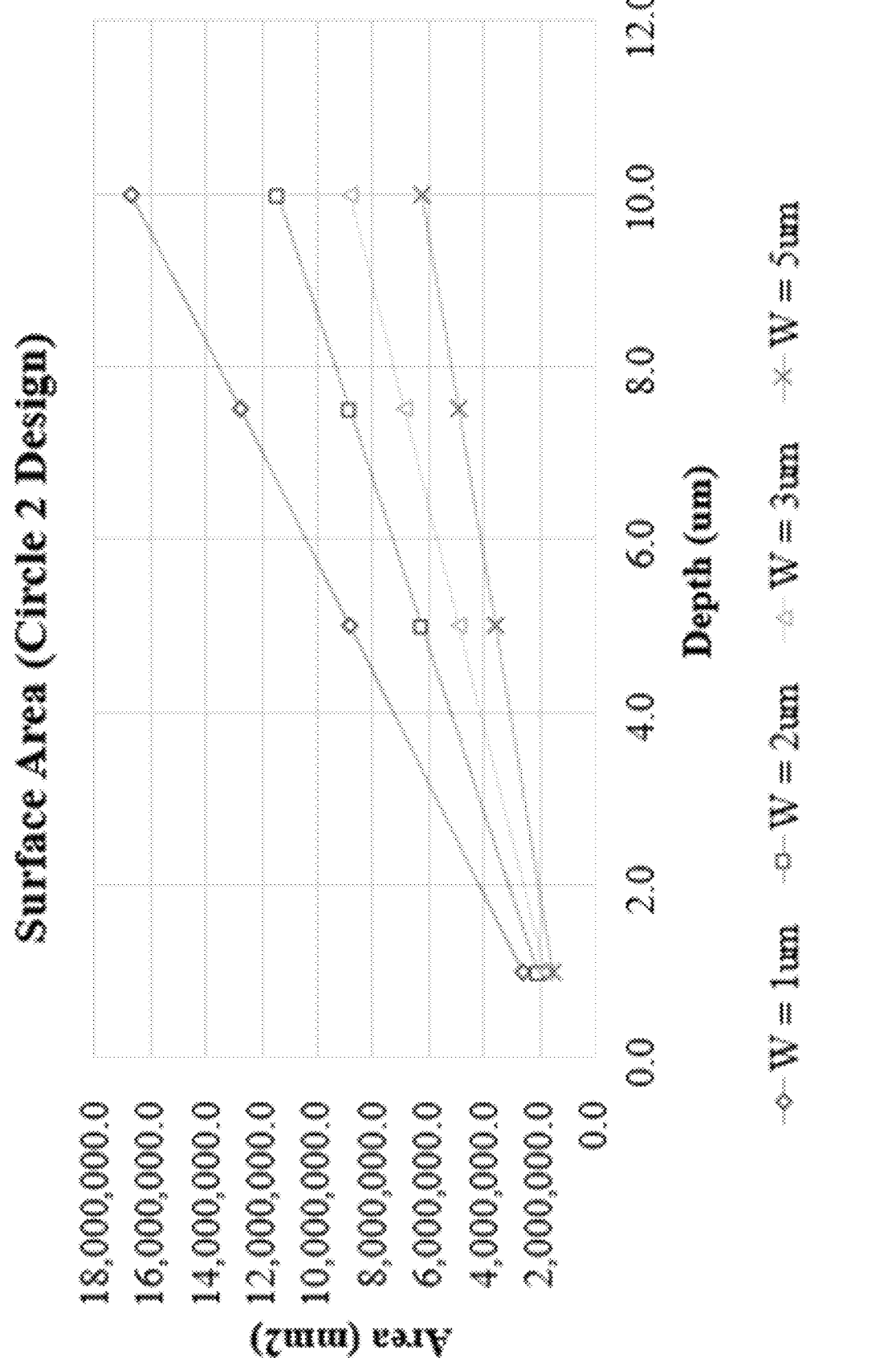
FIG. 5B illustrates surface areas according to the depth of the three-dimensional pattern of FIG. 3E according to an embodiment.

Also, FIGS. 5A and 5B illustrate the surface area according to the depth of the 3D structure and the width W of the line for the square pattern and the circle 2 pattern, respectively, according to embodiments of the present disclosure. As can be seen from FIG. 5, the surface area increases as the depth increases, and the aspect ratio (AR) increases as the depth increases. For example, the aspect ratio (AR) may be a ratio of the depth of a unit portion (e.g., a protruding portion or a recessed portion) in each pattern to the width of the protruding or recessed portion.

In embodiments of the present disclosure, the three-dimensional structure of the etched silicon substrate is preferably designed with an aspect ratio of 3:1 to 60:1 depending on the depth. When the aspect ratio is higher than 60:1, etching and side deposition of silicon may be difficult. When the aspect ratio is lower than 3:1, the increase in the surface area may not be sufficiently large to obtain the desirable capacitance per unit area. In addition, as a second configuration of the three-dimensional silicon capacitor according to an embodiment of the present disclosure, a dielectric thin film in which a single-component dielectric has a crystal gradient form is included on the silicon substrate.

The dielectric thin film according to an embodiment of the present disclosure has a high permittivity and a low leakage current value, so that a high-performance silicon capacitor can be provided.

In order to provide a high-performance silicon capacitor with a high permittivity and a low leakage current, embodiments of the present disclosure may have a structure combining parts having various crystallinity in a single component or heterogeneous thin film, that is, a structure in which a dielectric has a crystallinity gradient form, and to realize this in the process, the plasma process used during PEALD's thin film deposition process was used. In ALD, which is generally deposited at a relatively low temperature, an amorphous thin film is deposited, and then it has been confirmed that crystal nucleation and crystallinity can be induced using plasma treatment.

A thin film having a selectively crystallized structure in the thickness direction can be formed as follows so that permittivity and leakage current can be optimized using the PEALD plasma process. As an example, the dielectric thin film according to embodiments of the present disclosure may have a structure in which crystalline grains are embedded on an amorphous layer or a crystalline layer is stacked on an amorphous layer.

Figure 2A:
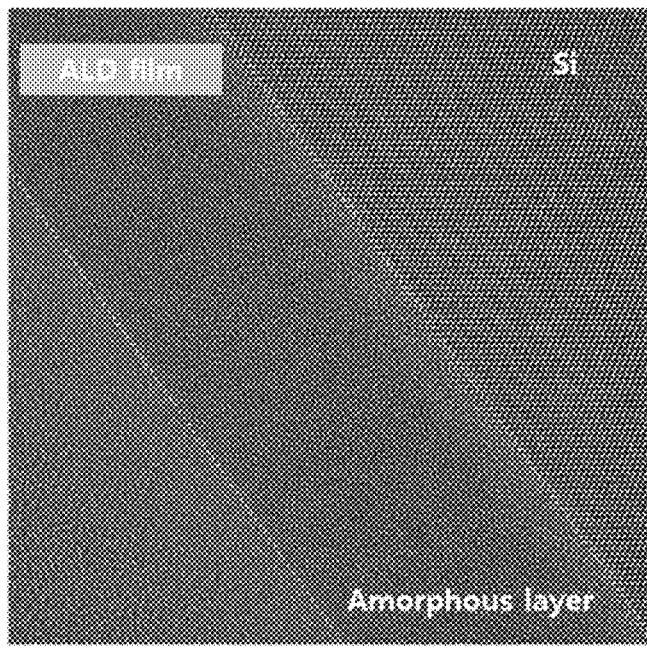
FIG. 2A is a SEM image showing an amorphous ALD thin film during deposition according to an embodiment.
Figure 2B:
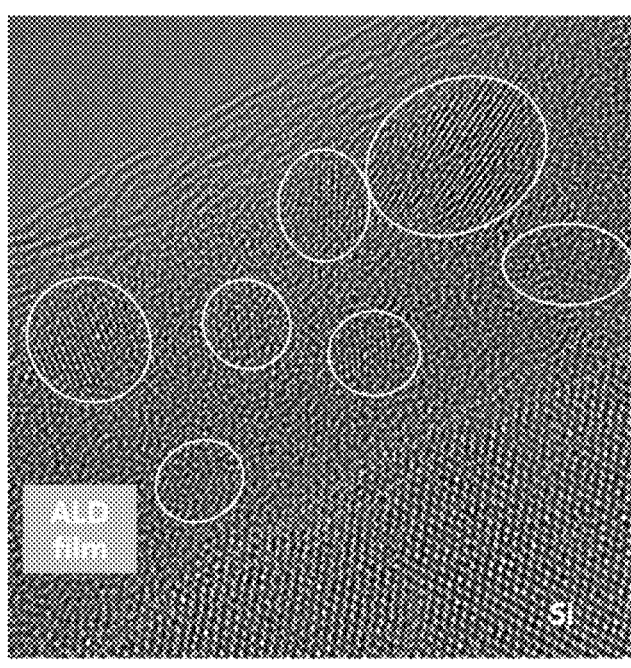
FIG. 2B is a photograph of a thin film plasma-treated for 2 minutes per ALD cycle, which shows an amorphous thin film in which crystal parts are embedded, according to an embodiment.

Referring back to FIG. 2A is a SEM image showing a film during deposition, which shows an amorphous ALD thin film. FIG. 2B is a photograph showing a thin film plasma-treated for 2 minutes per ALD cycle, which shows an amorphous matrix thin film in which crystal parts are embedded. FIG. 2C is a result of plasma treatment for 180 minutes after film deposition and shows a thin film having a combination structure of a crystallized layer and an amorphous layer. For example, regions encircled by solid lines indicate regions in which the crystallinity is confirmed.

Figure 6:
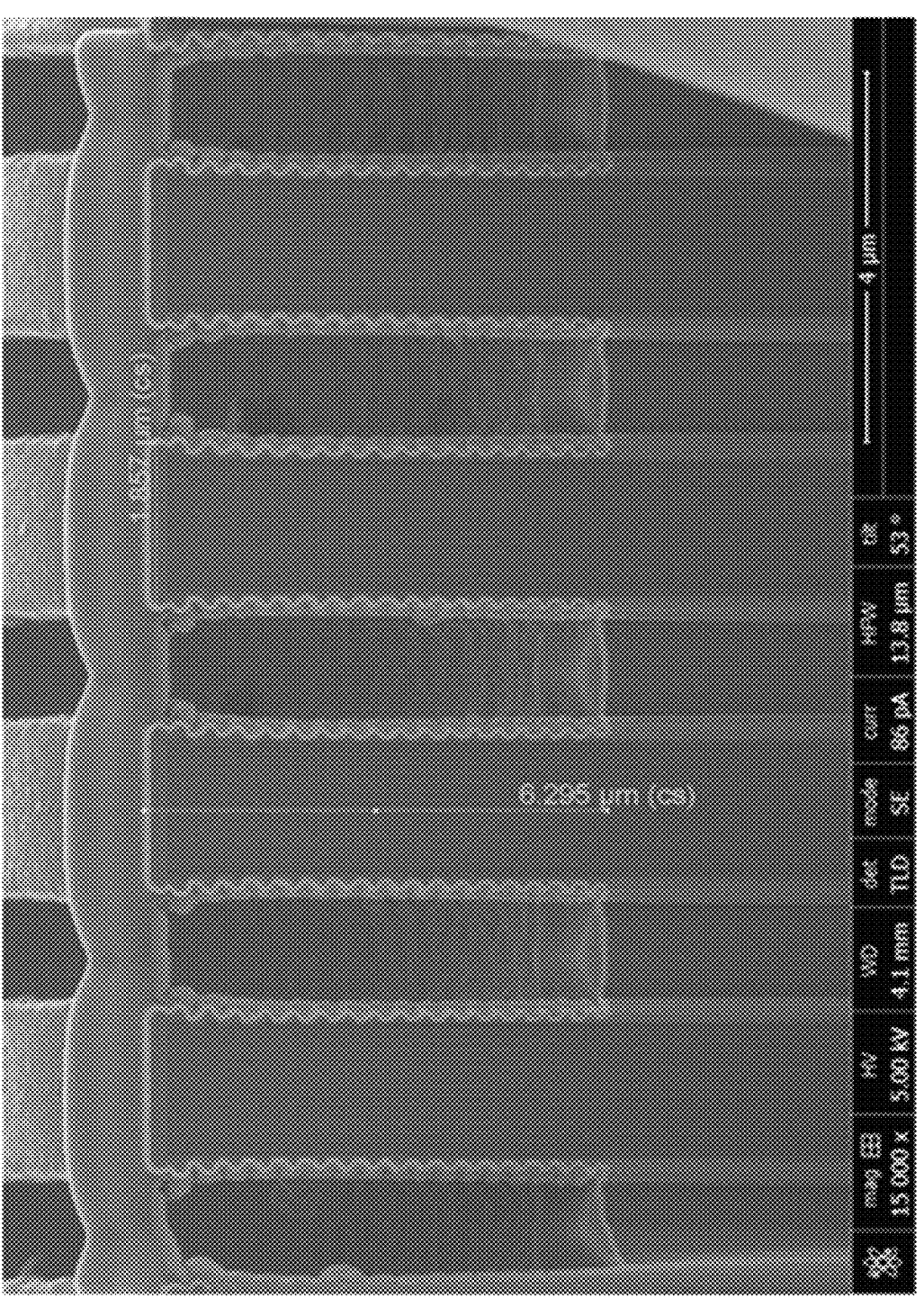
FIG. 6 shows an image taken with an FIB showing the structure of a three-dimensional silicon capacitor according to an embodiment of the present disclosure.

FIG. 6 is an image photograph taken by FIB showing the structure of the three-dimensional crystalline dielectric thin film capacitor according to an embodiment of the present disclosure. More specifically, the drawing of FIG. 6 is an FIB image in which electrodes and dielectrics are deposited after etching silicon in a rectangular pattern of FIG. 3B.

Figure 7A:
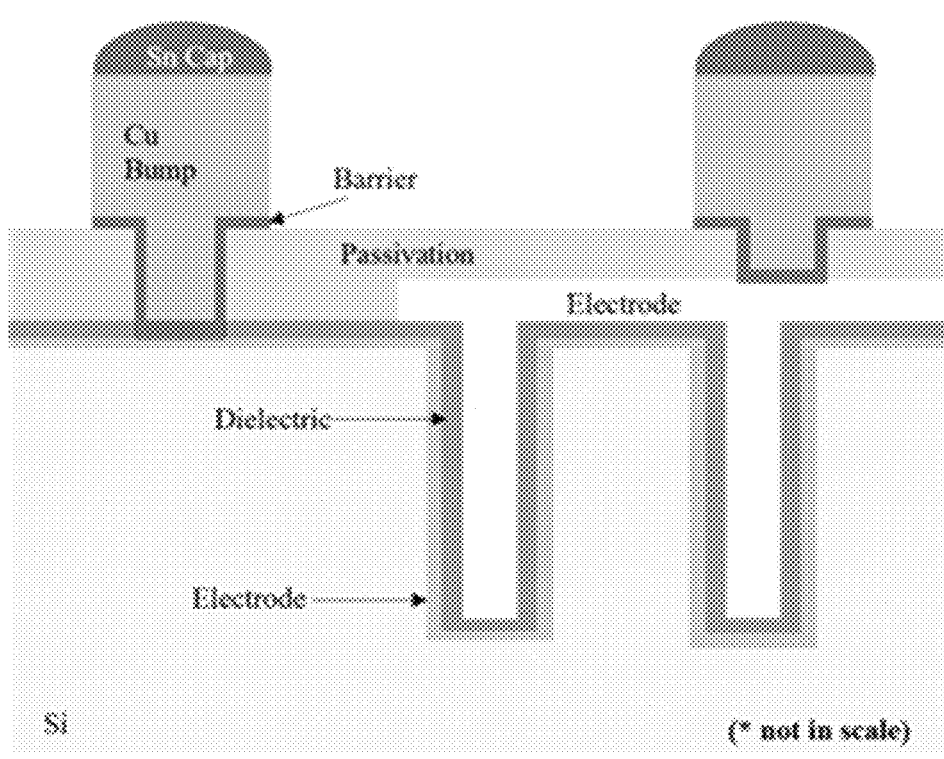
FIGS. 7A and 7B schematically show cross-sectional areas of products each manufactured using a silicon capacitor and a flip chip bump on a silicon substrate according to embodiments of the present disclosure.
Figure 7B:
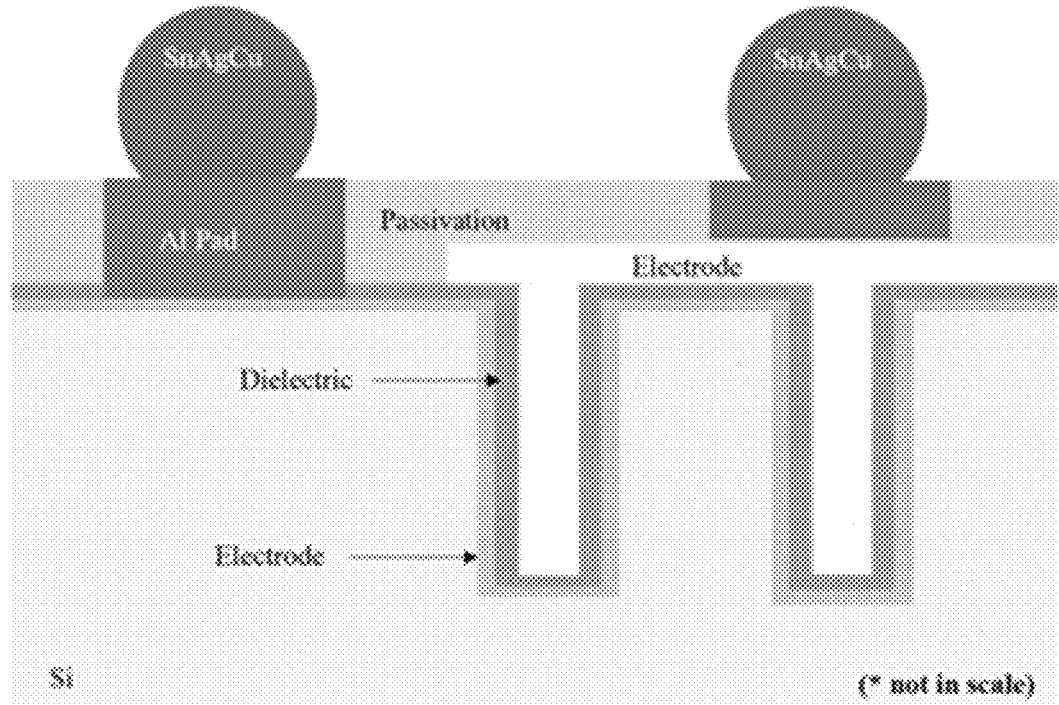

In addition, devices including the three-dimensional crystalline dielectric thin film capacitor according to embodiments of the present disclosure on a silicon substrate and using flip chip bumps are shown in FIGS. 7A and 7B.

FIG. 7A shows the Cu pillar/Sn cap bump structure, and FIG. 7B shows the solder bump structure. In other embodiments, the bump structure may not be positioned at the top as shown in FIGS. 7A and 7B, but be positioned at the bottom using a TSV (through Si via).

The three-dimensional crystalline dielectric thin film capacitor according to embodiments of the present disclosure can be manufactured by the following method.

More specifically, a method of manufacturing a three-dimensional crystalline dielectric thin film capacitor according to an embodiment of the present disclosure includes a first step of etching a silicon substrate to form a three-dimensional structure; a second step of depositing an amorphous thin film on the etched silicon substrate at a low temperature; a third step of embedding crystalline grains in the low-temperature deposited amorphous thin film by performing plasma treatment; and a fourth step of optionally repeating the second and third steps several to several tens of times.

The three-dimensional structure obtained by etching the silicon substrate in the first step may be formed in a pattern as shown in FIG. 3A, 3B, 3C, 3D, 3E, 3F, 3G, or 3H, and preferably has an aspect ratio of 3:1 to 60:1 depending on the depth.

Low-temperature deposition in the second step can use a low-temperature deposition, preferably lower than 300° C., that is available to form an amorphous thin film, and as an example, an ALD method can be used.

The plasma treatment in the third step is for fabricating crystal-embedded amorphous layer, which can be performed using plasma treatment after every ALD cycle or after ALD deposition. Specifically, plasma treatment may be performed after every ALD cycle is complete, or after the whole ALD deposition with a given number of ALD cycles is complete. For example, the plasma power can be adjusted at 100 W-1 kW, and the plasma treatment time is preferably less than 10 seconds after every ALD cycle, or 1 minute to 30 minutes when processing after the whole ALD deposition.

The thin film thus produced is shown in FIG. 2B.

Alternatively, a method of manufacturing a three-dimensional crystalline dielectric thin film capacitor according to an embodiment of the present disclosure includes a first step of etching a silicon substrate to form a three-dimensional structure; a second step of depositing an amorphous thin film on the etched silicon substrate at a low temperature; and a third step of depositing a crystalline layer on the low-temperature deposited amorphous thin film by performing plasma treatment either after each ALD cycle or after the whole ALD deposition.

The three-dimensional structure obtained by etching the silicon substrate in the first step may be formed in a pattern as shown in FIG. 3A, 3B, 3C, 3D, 3E, 3F, 3G, or 3H, and preferably has an aspect ratio of 3:1 to 60:1 depending on the depth.

The low temperature deposition in the second step may use a low temperature deposition that is available for forming an amorphous thin film, and as an example, an ALD method may be used.

The plasma treatment in the third step is for crystallization, which can be performed using a PEALD plasma process, and the plasma treatment can be performed after each ALD cycle or on the outermost surface after all ALD deposition is finished. For example, the plasma power can be adjusted at 100 W-1 kW, and the plasma treatment time is preferably 10 seconds to 1 minute when processing after each ALD cycle, and 30 minutes to 180 minutes when processing after the whole ALD deposition.

The thin film thus produced is shown in FIG. 2C.

Figure 8:
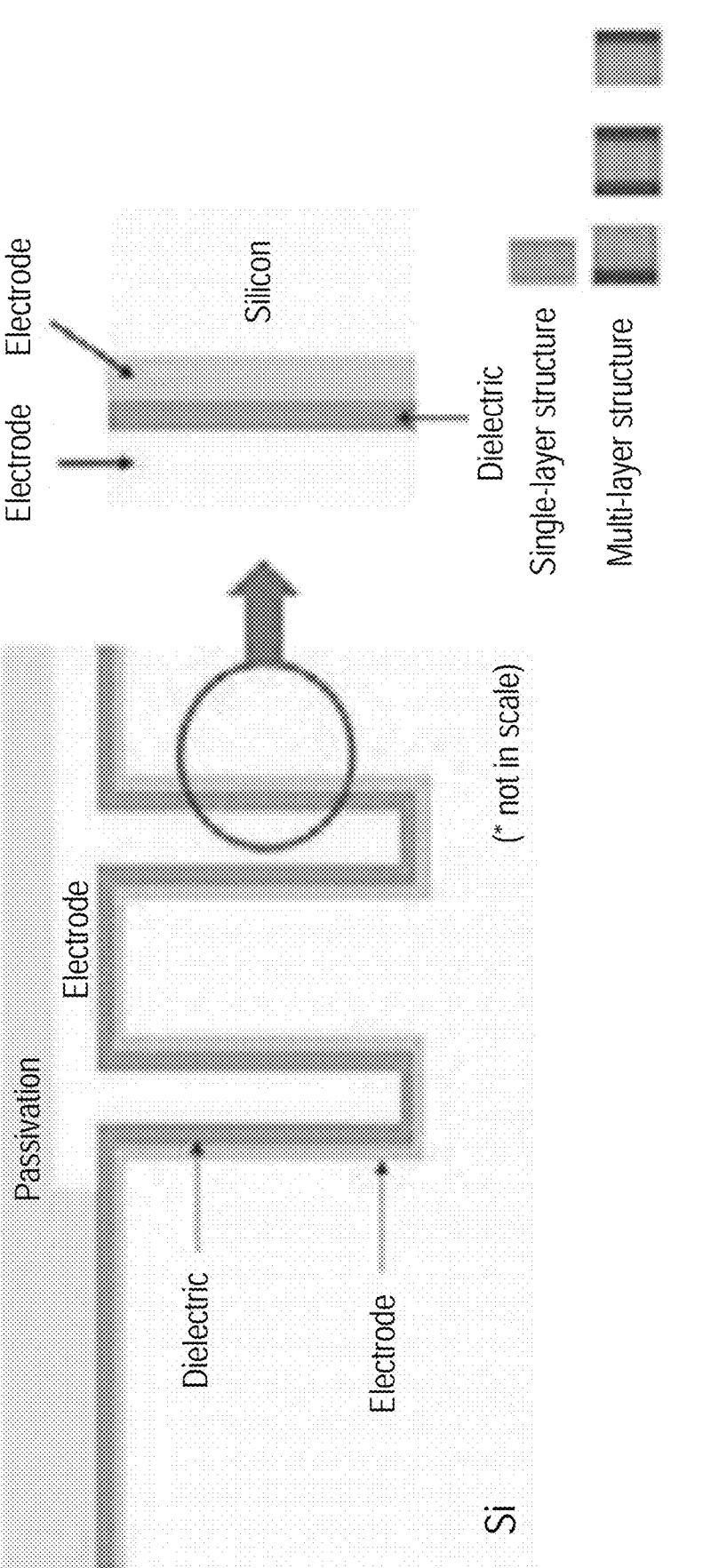
FIG. 8 illustrates a three-dimensional silicon capacitor of the present disclosure according to embodiments.

FIG. 8 illustrates a three-dimensional silicon capacitor according to various embodiments. In an embodiment, a dielectric layer interposed between a pair of electrodes may have a single-layer structure with a crystal gradient form. For example, the single-layer structure may be an amorphous layer within which crystal grains are embedded. In other embodiments, a dielectric layer interposed between a pair of electrodes may have a multi-layer structure with a crystal gradient form. For example, the multi-layer structure may include an amorphous layer and a crystalline layer dispose on one of a first surface of the amorphous layer and a second surface of the amorphous layer, the first surface and the second surface being opposite to each other. In another example, the multi-layer structure may include an amorphous layer and a pair of crystalline layers disposed on both opposite surfaces of the amorphous layer, respectively.

A silicon capacitor and a manufacturing method thereof according to embodiments of the present disclosure may be included in various electronic devices, for example, semiconductor devices or MEMS devices.

Aspects of the present disclosure have been described in conjunction with the specific embodiments thereof that are proposed as examples. Numerous alternatives, modifications, and variations to the embodiments as set forth herein may be made without departing from the scope of the claims set forth below. Accordingly, embodiments as set forth herein are intended to be illustrative and not limiting.

What is claimed is:

1. A silicon capacitor, comprising:
a silicon substrate having a first circle pattern; and
a dielectric thin film disposed over the silicon substrate and having a structure with a crystal gradient form,
wherein the first circle pattern of the silicon substrate includes a plurality of recessed portions each having an annular cylinder shape, outer surfaces of an adjacent pair of the plurality of recessed portions contact each other.

2. The silicon capacitor according to claim 1, wherein the adjacent pair of the plurality of recessed portions includes a first recessed portion and a second recessed portion, and a distance between centers of the first and second recessed portions is equal to a sum of a first outer radius of the first recessed portion and a second outer radius of the first recessed portion.

3. A silicon capacitor, comprising:
a silicon substrate having a first circle pattern; and
a dielectric thin film disposed over the silicon substrate and having a structure with a crystal gradient form,
wherein the first circle pattern of the silicon substrate includes a plurality of protruding portions each having an annular cylinder shape, outer surfaces of an adjacent pair of the plurality of protruding portions contact each other.

4. The silicon capacitor according to claim 3, wherein the adjacent pair of the plurality of protruding portions includes a first protruding portion and a second protruding portion, and a distance between centers of the first and second protruding portions is equal to a sum of a first outer radius of the first protruding portion and a second outer radius of the first protruding portion.

* * * * *